Figures 1, 2:
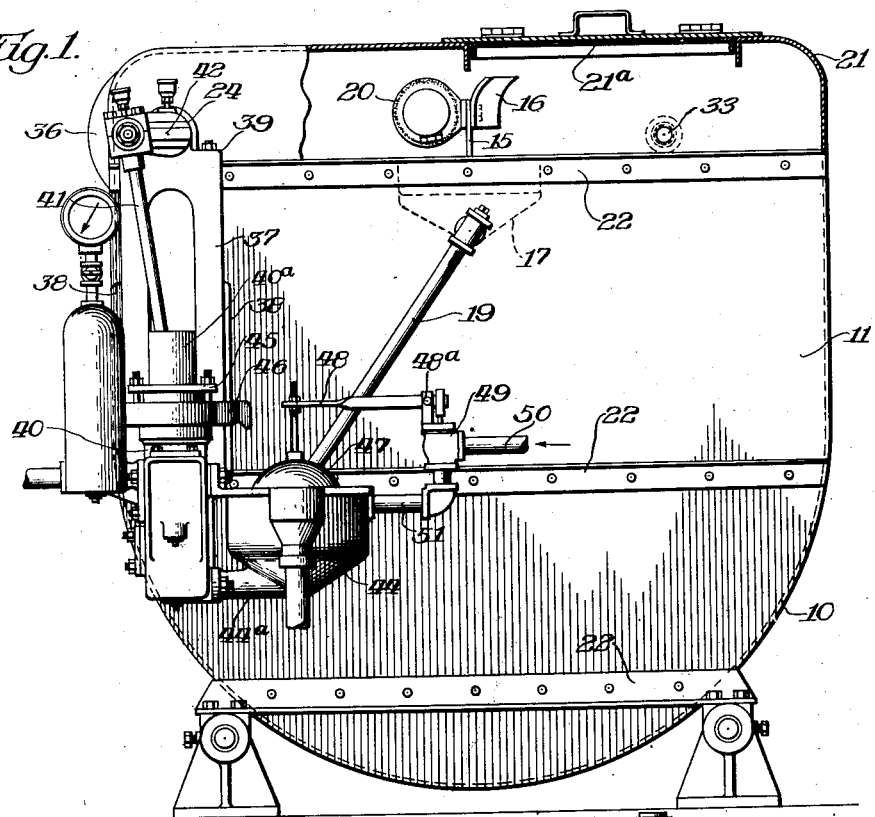

Aug. 9, 1927.

W. H. GREEN 1,638,119

CHEMICAL MIXING AND FEEDING APPARATUS

Filed Oct. 24, 1923

Witness
Geo. C. Davison

Inventor:
Walter H. Green
By Cornwell Sudsworth
Attys

Patented Aug. 9, 1927.

1,638,119

UNITED STATES PATENT OFFICE.

WALTER H. GREEN, OF CHICAGO, ILLINOIS, ASSIGNOR TO GENERAL ZEOLITE COMPANY, OF CHICAGO, ILLINOIS, A CORPORATION OF ILLINOIS.

CHEMICAL MIXING AND FEEDING APPARATUS.

Application filed October 24, 1923. Serial No. 670,431.

This invention relates broadly to apparatus adapted for use in softening of water, or like employment and has for its object the improvement of means for mechanically mixing solid and liquid materials to form a treating mixture and for measuring and conveying such mixture to the intended point of use. The present invention comprises certain improvements in the general type of apparatus illustrated and described in my Letters Patent No. 1,321,622, granted November 11, 1919.

It is well known in the art, in the operation of water softening apparatus in which the raw water is treated with chemicals, such as lime and soda ash, to prepare so-called solutions or treating mixtures of the desired chemicals with water, which mixtures are fed to the raw water in desired proportions. My Letters Patent above referred to describe an apparatus which possesses certain utility in the production and maintenance of a uniform solution or mixture of ingredients, such as those just mentioned. It has been found from experience in the handling of solutions or a suspension of lime in water, that incrustations form on various portions of the apparatus, as heretofore employed, and interfere with its operation and accuracy by clogging or impeding conduits and other portions of the mechanism.

The general object of the present invention is the provision of improved mechanism designed to increase the reliability of the performance of such apparatus, facilitate the handling of the treating mixture, particularly when it is to be delivered to a point of use at a distance or at an increased elevation from the mixing tank, and which may be installed and maintained with increased facility.

More definitely stated, one of the objects of the invention is the provision of apparatus which will prevent, to a very substantial degree, the forming, on the measuring or apportioning devices of incrustations from such treating mixtures as water and hydrated lime.

Another object is the provision of mechanism which will co-ordinate the measuring of the treating material with the delivery thereof to the point of use.

Other and further objects of the invention will be pointed out hereinafter, indicated in the appended claims, or obvious to one skilled in the art upon an understanding of the present disclosure.

For the purpose of the present application I have elected to present herein one form of apparatus in which the invention may be embodied, but it is to be understood that the same is herewith presented for illustrative purposes only and that it is not to be accorded an interpretation such as might have the effect of limiting the invention which I purport to secure, short of its true and most comprehensive scope in the art. This embodiment is shown in the accompanying drawing which forms a part of this specification, and in which Fig. 1 is a side elevation with part in section, and Fig. 2 an abbreviated top view with the removable closure off and a part of the cover broken away.

The nature of the invention will best be understood by immediate reference to this illustrative embodiment. It will be observed that it comprises a tank having its lower portion 10 of semi-cylindrical form with parallel vertical end walls 11. Within this tank, in suitable journals, one of which is illustrated at 12, is journalled the agitator shaft 14. This carries a plurality of agitator arms 15 extending radially. These carry at their extremities the plow shaped agitators 16 which are adapted to revolve in proximity to the curved bottom portion of the tank, as the shaft 14 is rotated, thereby maintaining a proper agitation of the material in the tank. On the inside of one of the end walls is mounted a collector funnel 17 which discharges at its bottom by way of a connection 18 to the discharge pipe 19. The agitator arms adjacent said end of the tank carry dispensing devices in the nature of measuring cups 20, by which material is dipped up from the tank and discharged into the funnel 17, in measured quantities, as described in my Letters Patent above referred to.

In the treatment of water with lime and soda ash, those materials are deposited in the tank and there mixed with the proper proportion of water admitted through an inlet 33, the agitators serving to maintain a uniform mixture of the materials, and the measuring cups to dispense it in the desired quantities for mixture with the raw water. In the use of a chemical mixture of this sort there is a tendency of the solids to form incrustations on the agitators, on the cups 20, particularly in their straining screens and discharge orifices, on the marginal portion of the funnel 17, and on other parts of the mechanism in the tank. These incrustations affect the measuring accuracy of the cups and sometimes fall into the funnel and clog or impede its outlet connection 18. Such has been the experience with constructions of the type illustrated in the patent. While such occurrences do not destroy the utility of the apparatus, it is to be recognized that they may affect its accuracy, and it is of distinct advantage that apparatus of this type be qualified to run continuously for extended periods of time without direct supervision, and that it be infallibly reliable and "fool proof," at all times. I find that changes in the mixture are not desirable and that strainers or the like over the funnel 17 tend to interfere with the accuracy of the device and offer added opportunity for incrustations. After extensive experiment, however, I have discovered that the difficulty may be obviated by the apparently simple expedient of completely enclosing all of the working parts subjected to contact with the materials in the tank, particularly the parts depended on to measure the dispensed material. Consequently, I have provided the tank with a top or closure portion 21 which includes a removable part 21$^a$, permitting the introduction of the desired chemicals into the tank, and allowing for inspection and access to the contained working parts. As a result of this arrangement of the portions of the apparatus subjected to contact with the treating materials, the formation of incrustations on the measuring devices is effectively inhibited, and difficulties heretofore experienced from that cause are obviated. As a result, the reliability and accuracy of the apparatus is assured, without the necessity for constant supervision or frequent inspection. Moreover, the heretofore necessary frequent removal of such incrustations is eliminated. While I cannot state with assurance the reason or reasons why this arrangement attains this greatly advantageous result, I believe that it may be due in part to the fact that the air surrounding the measuring cups and other parts subject to contact with the treating materials is kept in a humid condition, and to the further circumstance that there is no free circulation of external air into contact with those parts. These conditions would tend to hinder the formation of incrustations by virtue of the facts that material is not allowed to dry rapidly on the parts and there is no opportunity afforded for carbonation of the treating material by such quantities of carbon dioxide as might be brought into contact with the wet parts by the air.

In my Letters Patent above referred to, the mixing and feeding parts are illustrated as mounted on top of the reaction tank into which the treating material is fed by gravity. It frequently happens that it is inexpedient to place the chemical mixing tank at an elevation whence the treating material may be fed to the reaction tank by gravity. While various pumping arrangements might be adequate to handle and convey the treating material discharged by way of the pipe 19, it is of very great importance in the utilization of mechanism of this type, that the actual delivery of the treating material to the raw water conform in quantity and rate to the apportionments discharged from the mixing tank by the measuring apparatus. This is due to the fact that such apportionments are based directly on the condition and quantity of the raw water supplied over a given interval of time. By virtue of the arrangement now about to be described, I provide an apparatus by which the rate of delivery of the treating material to the raw water at a distance or at an elevation, may be maintained in consonance with its apportionment by the measuring mechanism. It will be seen that the ends of the tank are stiffened by horizontally extending angle members 22 arranged at different elevations. On certain of these angle members, adjacent one side of the tank, are mounted drive shaft bearings 23 and 24, in which is journalled the drive shaft 25 extending longitudinally through the tank. Inside the tank this shaft carries a sprocket wheel 26 having operable connection, by means of a chain 27, with a sprocket wheel 28 on the agitator shaft 14. Power is transmitted to the drive shaft 25 from a prime mover 29, through a belt 30, pulley 31, encased reducing gears 32, sprocket wheel 34 and its chain 35, which latter transmits to sprocket wheel 36 mounted on the drive shaft. These power elements are mounted preferably at one end of the tank. On the opposite end of the tank is mounted a pump frame 37 which has spacers 38 engaging the end wall, and brackets 39 engaging over and bolted to the angle members 22, the bearing 24 being formed integrally with the upper bracket. The pump frame 37 supports the pump 40 having the vertically reciprocating piston 40$^a$, which is driven through the instrumentality of the connecting rod 41 and the crank 42 which is keyed to the end of the drive shaft 25. Supported on the casing of the pump 40 is a receptacle 44 which receives the treating mixture discharged through the pipe 19. Surrounding the gland 45 of the pump's piston, is a collecting gutter 46 by which leakage around the piston is returned to the receptacle 44. At its bottom the receptacle 44 connects with the intake of the pump by means of a conduit 44$^a$. Within the receptacle 44 there is a float 47 which controls a lever 48 fulcrumed at 48ª and rigged to operate valve 49. The latter controls the flow connection between a pipe 50, which leads from a source of clear water supply, and the pipe 51, which discharges into the receptacle 44.

In the operation of the device, it will be understood that the treating mixture discharged through the pipe 19 is of uniform strength, although, of course, it may be varied in amount from time to time, in accordance with the requirements of the raw water or the rate of supply of the latter. Automatic means for effecting such variation is illustrated in my Letters Patent referred to. This material is received by receptacle 44 and withdrawn therefrom by the pump 40, which forces it to the point of disposal. The level of liquid in the receptacle 44 will be maintained by the float 47, which admits clear water from the pipe 50 immediately there is any deficiency of treating liquid in the receptacle. Consequently, although the amount of liquid in receptacle 44 remains the same, so that there will be a constant uniform supply in the pump, the strength of that liquid in treating material will vary in accordance with variations of supply of the latter from the mixing tank. Therefore, treating material will be delivered to the point of use at the same rate at which it is apportioned out of the mixing tank, provided synchronism is maintained between the pump and the measuring mechanism. This synchronism is maintained in the arrangement by virtue of the direct and positive operative connection between the shaft 14 and the pump crank 42.

In addition to this effect, the construction provides a compact assembly of cooperating parts associated in such manner as to prevent their getting out of adjustment and obviating the necessity for supports or foundations other than that requisite for the mixing tank itself.

What I claim is:

1. Feeding apparatus, comprising, in combination, a container for liquid, measuring apparatus for apportioning liquid contained therein for discharge therefrom, and a closure co-operating with the container to completely house the measuring apparatus therein.

2. Feeding apparatus, comprising, in combination, a container for liquid, a measuring apparatus operating in the container to measure liquid contained therein for discharge therefrom, and means cooperating with the container to inhibit free ingress of atmospheric air to the measuring apparatus.

3. Apparatus of the class described, comprising the combination of a tank, mixing and dispensing devices operable in the same, a pump mounted on the exterior of the tank and including a supply receptacle arranged to receive liquid discharged by the dispensing devices, and means journalled on the tank for transmitting operative movement to the dispensing devices and pump.

4. In apparatus of the sort described, the combination of a tank, a drive shaft journalled thereon, means for actuating the drive shaft, mixing and dispensing devices operable in the tank, a pump mounted on the exterior of the tank for reception of liquid dispensed by the dispensing devices, and means for actuating said devices and the pump from the drive shaft.

5. In apparatus of the class described, the combination of a tank, a dispensing device operable therein, a funnel mounted on the interior of the tank to receive liquid from said dispensing device, a receptacle supported on the outside of the tank, a conduit for conducting liquid to said receptacle from said funnel, and a pump mounted on the exterior of the tank and arranged to draw liquid from said receptacle.

6. In apparatus of the class described, in combination, a tank, a dispensing device operable therein, a funnel mounted in the tank to receive liquid from said device, a receptacle supported on the exterior of the tank in fixed relationship to said funnel, means for conducting liquid from the funnel to the receptacle, and a pump mounted in fixed relationship to the receptacle.

7. Apparatus of the class described comprising, in combination, a closed tank, mixing and dispensing devices operable therein, a pump mounted exteriorly of the tank and supplied by the dispensing devices, and means journalled on the tank for transmitting operative movement to the pump and to the dispensing devices to supply the pump with material from within the tank.

8. Apparatus for preparing and apportioning water treating material comprising, in combination, a container for liquid, measuring apparatus operating in the container for apportioning liquid contained therein, and means cooperating with the container to inhibit dispersal of air humidity from about the measuring apparatus.

In testimony whereof I have hereunto subscribed my name.

WALTER H. GREEN.